United States Patent
Wong

(10) Patent No.: US 9,665,382 B2
(45) Date of Patent: May 30, 2017

(54) METHOD AND APPARATUS FOR PROVIDING A CROSS-DEVICE MACRO FRAMEWORK

(75) Inventor: Eldon Wong, Vancouver (CA)

(73) Assignee: Change Healthcare LLC, Alpharetta, GA (US)

( * ) Notice: Subject to any disclaimer, the term of this patent is extended or adjusted under 35 U.S.C. 154(b) by 29 days.

(21) Appl. No.: 13/612,285

(22) Filed: Sep. 12, 2012

(65) Prior Publication Data

US 2014/0075303 A1 Mar. 13, 2014

(51) Int. Cl.
*G06F 3/048* (2013.01)
*G06F 9/44* (2006.01)

(52) U.S. Cl.
CPC ............ *G06F 9/4443* (2013.01); *G06F 3/048* (2013.01)

(58) Field of Classification Search
CPC ........ G06F 9/542; G06F 8/41; G06F 11/3438; G06F 9/45504; G06F 11/3414; G06F 3/048; G06F 9/4443; H04N 21/6125; G06Q 40/08
USPC ................. 715/704, 212, 711, 213, 240, 260
See application file for complete search history.

(56) References Cited

U.S. PATENT DOCUMENTS

| | | | |
|---|---|---|---|
| 4,868,866 A | | 9/1989 | Williams, Jr. |
| 6,105,043 A | * | 8/2000 | Francisco et al. ............ 715/234 |
| 6,988,241 B1 | * | 1/2006 | Guttman et al. .............. 715/220 |
| 7,139,978 B2 | * | 11/2006 | Rojewski et al. ............ 715/744 |
| 7,421,654 B2 | * | 9/2008 | Wugoski ...................... 715/704 |
| 7,426,688 B2 | * | 9/2008 | Serra et al. ................... 715/212 |
| 8,144,854 B2 | | 3/2012 | Rodman |
| 8,145,803 B2 | * | 3/2012 | Hwang et al. ................. 710/20 |
| 8,209,444 B2 | * | 6/2012 | Huang ............................ 710/18 |
| 8,281,242 B2 | * | 10/2012 | Gomes et al. ................ 715/711 |
| 8,566,716 B2 | * | 10/2013 | Haynes et al. ................ 715/704 |
| 2006/0184710 A1 | | 8/2006 | Valdivia et al. |
| 2008/0034288 A1 | * | 2/2008 | Landar et al. ................ 715/700 |
| 2009/0100174 A1 | | 4/2009 | Annareddy et al. |
| 2009/0169178 A1 | | 7/2009 | Higgins et al. |

(Continued)

OTHER PUBLICATIONS

Crook. J.; "*Microsoft Patenting Multi-Screen, Multi—Touch Gestures;*" retrieved on Jun. 5, 2014 from <http://techcrunch.com/2011/08/25/microsoft-awarded-patents-for-multi-screen-multi-touch-gesture/>.

(Continued)

*Primary Examiner* — Xuyang Xia
(74) *Attorney, Agent, or Firm* — Alston & Bird LLP

(57) ABSTRACT

A method, apparatus and computer program product are provided in order to provide an efficient interface across multiple devices. The method, apparatus and computer program product may utilize multiple devices communicating with a macro identification module to identify macros from among input received from two or more of the devices to control operation of a target device. Input from each device may be received via a bridge module according to a framework for identifying input macros received from the multiple devices. One or more of the devices may execute the macro identification module to receive input via a bridge interface, or the macro identification module may be separate from the multiple devices. When macros are identified by the macro identification module, the macro identification module may communicate with an application executing on the target device to control the application.

17 Claims, 4 Drawing Sheets

(56) References Cited

U.S. PATENT DOCUMENTS

| | | | |
|---|---|---|---|
| 2009/0198856 A1 | 8/2009 | Habben | |
| 2010/0125653 A1 | 5/2010 | Cherian et al. | |
| 2010/0255907 A1* | 10/2010 | Yoro | A63F 13/10 463/31 |
| 2010/0296505 A1 | 11/2010 | Kissinger et al. | |
| 2011/0035523 A1 | 2/2011 | Feero et al. | |
| 2011/0041141 A1* | 2/2011 | Harm | G06F 9/541 719/318 |
| 2011/0214061 A1* | 9/2011 | King et al. | 715/736 |
| 2011/0289487 A1* | 11/2011 | Song | 717/130 |
| 2012/0047306 A1 | 2/2012 | Mitsubayashi | |
| 2012/0054604 A1* | 3/2012 | Warncke-Wang | 715/255 |
| 2012/0131645 A1* | 5/2012 | Harm | 726/4 |
| 2012/0271472 A1* | 10/2012 | Brunner et al. | 700/295 |
| 2014/0189188 A1 | 7/2014 | Whitby-Strevens et al. | |

OTHER PUBLICATIONS

Krcha. T.; "*Multicast Explained in Flash 10.1* P2P;" Flash Realtime. com; retrieved on Jun. 5, 2014 from <http://web.archive.org/web/20120513144832/ http://www.flashrealtime.com/multicast-explained-flash-101-p2p/>.

"Cirrus;" Adobe Labs; retrieved on Jun. 5, 2014 from <http://labs.adobe.com/technologies/cirrus/>.

Gestureworks; retrieved on Jun. 5, 2014 from <http://gestureworks.com/>.

Notice of Allowance for U.S. Appl. No. 13/606,338 dated Dec. 5, 2014.

\* cited by examiner

METHOD AND APPARATUS FOR PROVIDING A CROSS-DEVICE MACRO FRAMEWORK

TECHNOLOGICAL FIELD

An example embodiment of the present invention relates generally to device input operations and, more particularly, to a method and apparatus for implementing a cross-device macro framework.

BACKGROUND

It is common for users to interact with multiple electronic devices during the course of the day. Personal computers, smart phones, and tablet computers are near ubiquitous, and it is common for individuals to interact with field-specific electronic devices, such as medical diagnostic equipment, factory machinery, and the like. In order to efficiently interface with these devices, certain common interface functions may be associated with "macros" or shortcut keys. For example, word processors may allow a user to press ALT+S to save a document, rather than requiring the user to select a "save" option from a drop down menu. Users that are comfortable navigating through such macros may be able to interface with the particular application much more efficiently by avoiding unnecessary input operations and avoiding errors.

Advances in networking technology allow for the disparate devices of the modern workplace to communicate in new and never-before-seen ways. However, devices are still typically constrained to act on input received by the single particular device. Remote control interfaces and systems may allow for a user to access a first device using a second device, but such systems often require tight coupling between applications executing on each device, such that each application is fully aware of the messaging formats and instructions being provided by the other application. As such, the cross-device communication opportunities provided by the increased prevalence of smartphones, tablets, and other network-aware devices are not being fully utilized, resulting in inefficient interfaces.

BRIEF SUMMARY

A method, apparatus and computer program product are therefore provided according to an example embodiment of the present invention in order to provide an efficient interface across multiple devices. In this regard, the method, apparatus and computer program product of an example embodiment may utilize multiple devices communicating with a macro identification module to identify macros from among input received from two or more of the devices to control operation of a target device. Input from each device may be received via a bridge module according to a framework for identifying input macros received from the multiple devices. One or more of the devices may execute the macro identification module to receive input via a bridge interface, or the macro identification module may be separate from the multiple devices. When macros are identified by the macro identification module, the macro identification module may communicate with an application executing on the target device to control the application. The macros may be context aware, in that an input received from a particular device may include context information (e.g., whether a particular application was executing) when the input is transmitted to the macro identification module.

Example embodiments of the method may include receiving a first user input from a first device of a plurality of devices, receiving a second user input from a second device of the plurality of devices, identifying, using a processor, that at least a first rule for a macro is satisfied by the first user input, identifying that at least a second rule for the macro is satisfied by the second user input, determining that all rules for the macro have been satisfied, and sending instructions corresponding to the input operation defined by the macro to the at least one of the plurality of devices in response to determining that all rules for the macro have been met. Each of the plurality of devices may be configured with a processor and a memory for execution of program code. The macro may define at least one input operation to be performed by at least one of the plurality of devices.

Example embodiments of the invention may also include a computer program product. The computer program product may include at least one non-transitory computer-readable storage medium bearing computer program instructions embodied therein for use with a computer. The computer program instructions may include program instructions configured to receive a first user input from a first device of a plurality of devices, each of the plurality of devices configured with a processor and a memory for execution of program code, receive a second user input from a second device of the plurality of devices, identify that at least a first rule for a macro is satisfied by the first user input, the macro defining at least one input operation to be performed by at least one of the plurality of devices, identify that at least a second rule for the macro is satisfied by the second user input, determine that all rules for the macro have been satisfied, and send instructions corresponding to the input operation defined by the macro to the at least one of the plurality of devices in response to determining that all rules for the macro have been met.

Example embodiments of the invention may also include an apparatus. The apparatus may be configured to receive a first user input from a first device of a plurality of devices, each of the plurality of devices configured with a processor and a memory for execution of program code, receive a second user input from a second device of the plurality of devices, identify that at least a first rule for a macro is satisfied by the first user input, the macro defining at least one input operation to be performed by at least one of the plurality of devices, identify that at least a second rule for the macro is satisfied by the second user input, determine that all rules for the macro have been satisfied, and send instructions corresponding to the input operation defined by the macro to the at least one of the plurality of devices in response to determining that all rules for the macro have been met.

BRIEF DESCRIPTION OF THE DRAWINGS

Figure 1:
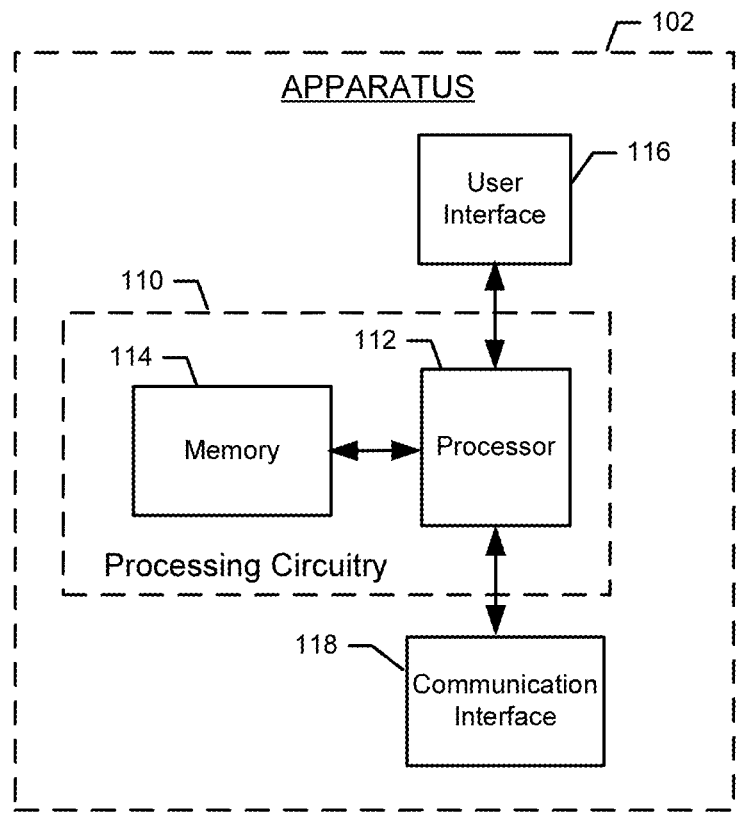
Figure 2:
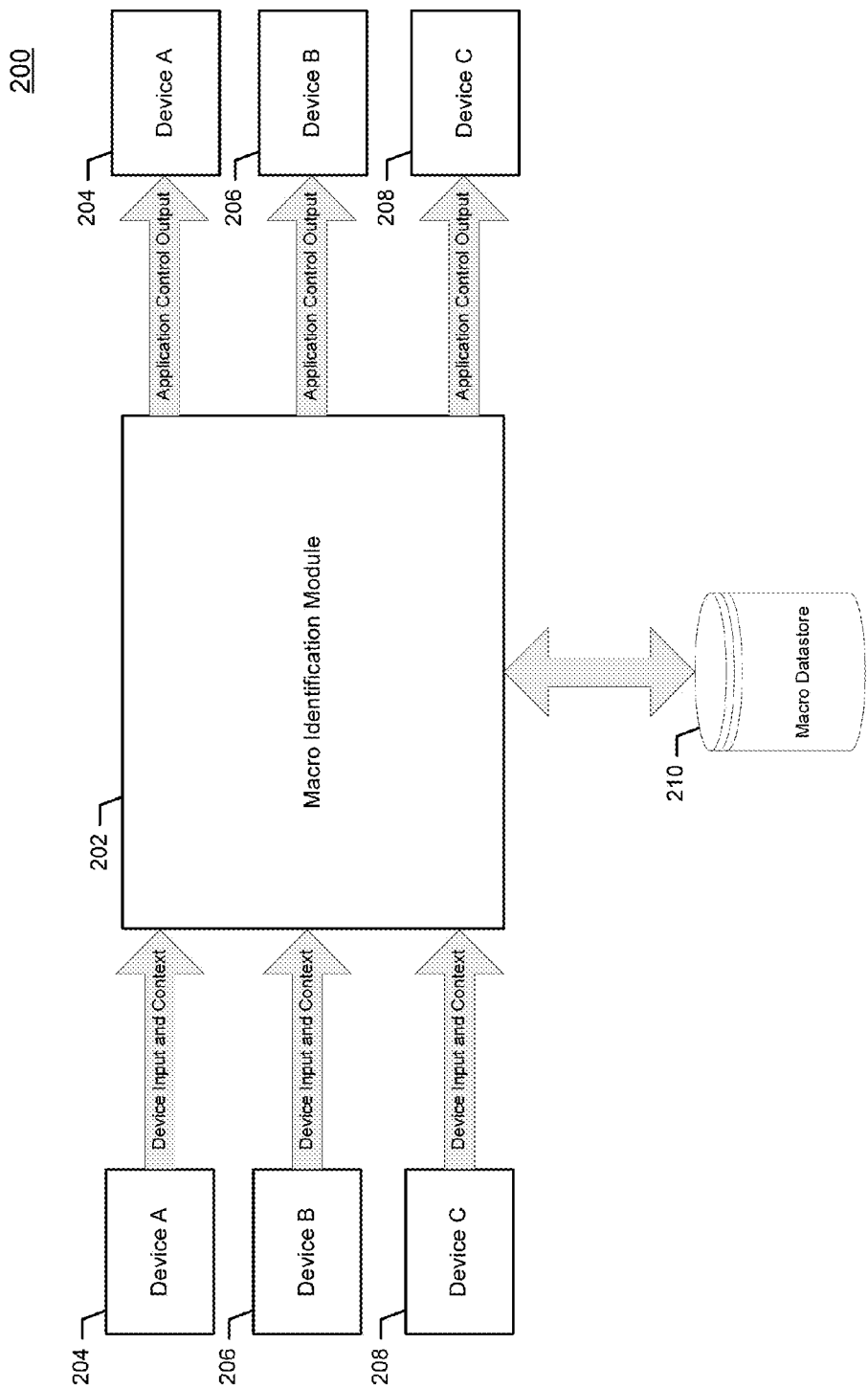
Figure 3:
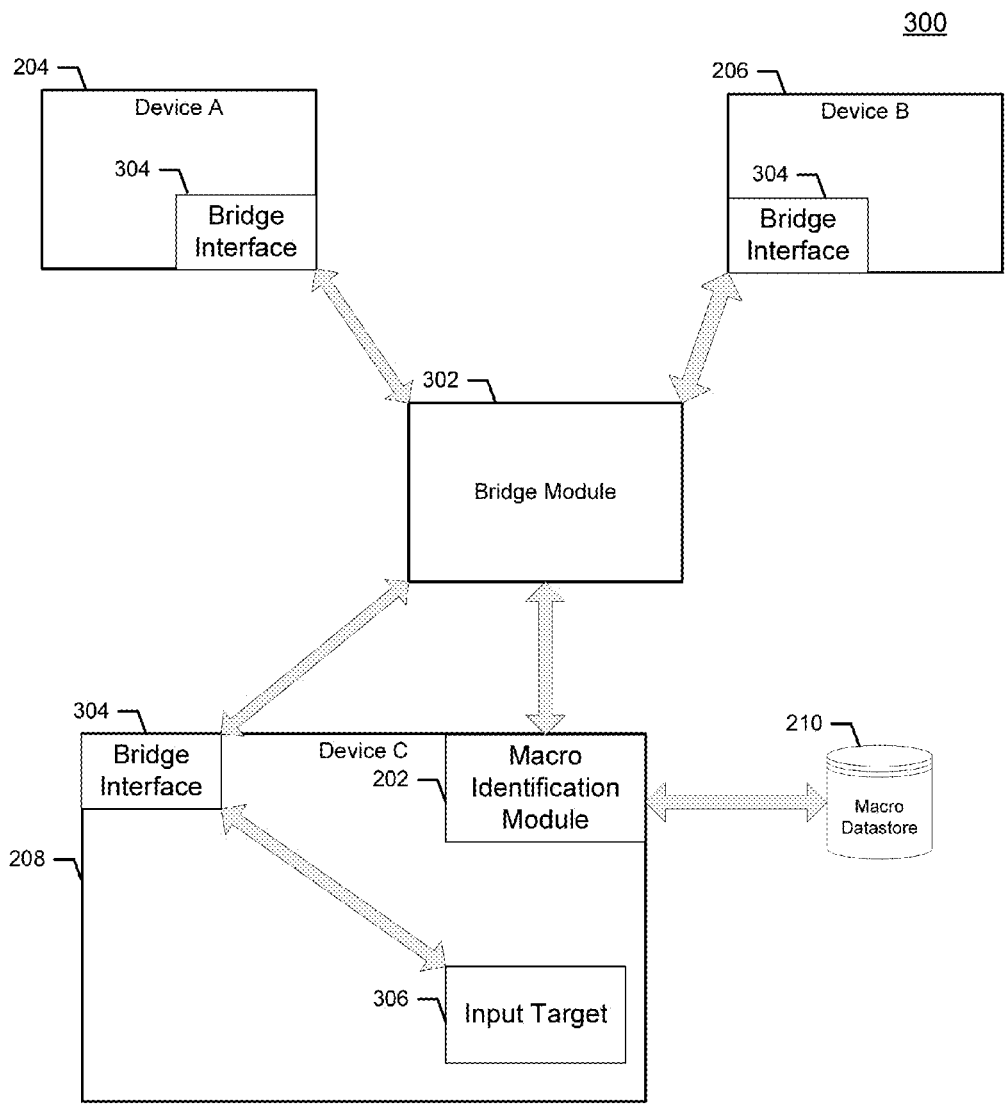
Figure 4:
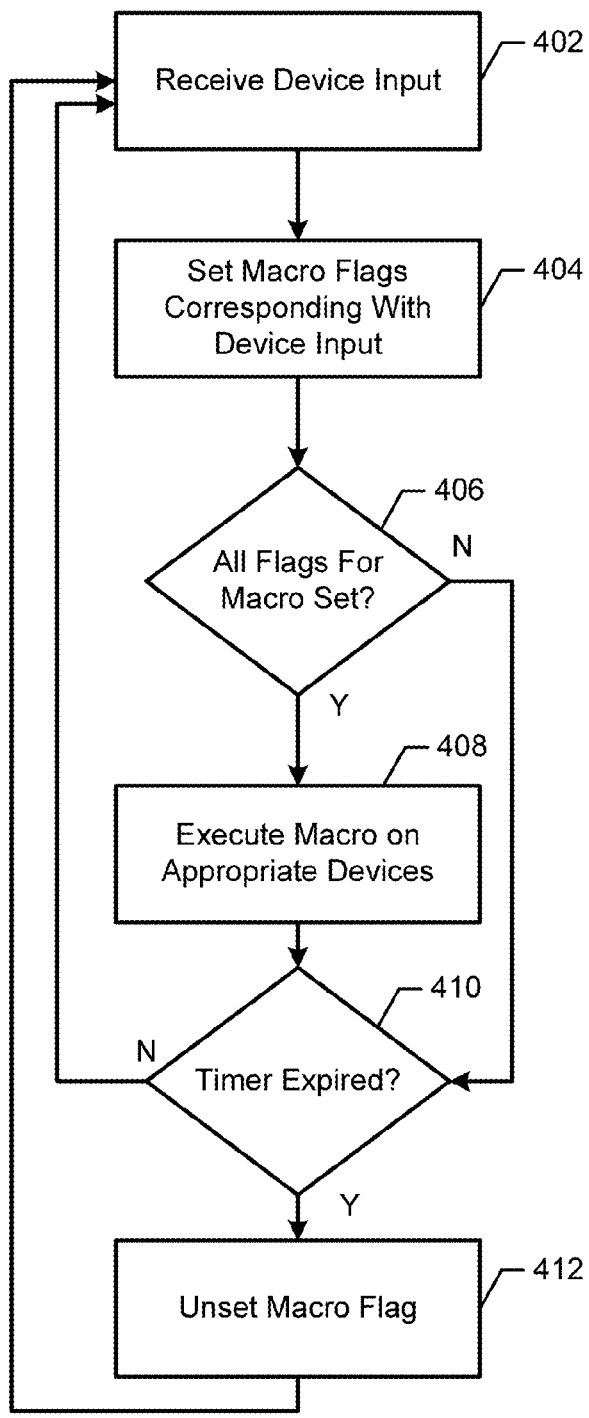

Having thus described certain embodiments of the invention in general terms, reference will now be made to the accompanying drawings, which are not necessarily drawn to scale, and wherein:

FIG. 1 is a block diagram of an apparatus that may be specifically configured in accordance with an example embodiment of the present invention;

FIG. 2 is a block diagram of a process flow among a plurality of devices in communication with a macro identification module in accordance with an example embodiment of the present invention;

FIG. 3 is a system diagram depicting an example of a plurality of mobile devices controlling input for one of the mobile devices using a macro identification module in accordance with an example embodiment of the present invention; and FIG. 4 is flow diagram depicting an example of a method for controlling a device according to input from multiple devices in accordance with an example embodiment of the present invention.

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

A method, apparatus and computer program product are provided in accordance with an example embodiment of the present invention in order to provide a framework for processing of inputs from multiple devices to enable cross-entity macro functionality. In this regard, a method, apparatus and computer program product of an example embodiment may receive inputs from a plurality of devices, and process the inputs to identify one or more macros. Upon identification of a macro from the received inputs, one or more of the devices may be instructed to take a particular action. The particular action may be associated with particular interface operations or other instruction based on the application or applications executing on the instructed device. Each of the plurality of devices may be configured to receive instruction in this manner.

FIG. 1 illustrates a block diagram of an apparatus 102 in accordance with some example embodiments. For example, the apparatus 102 may be implemented on a mobile computing device that may be configured implement and control devices in accordance with various example embodiments. Examples of computing devices that may correspond to the apparatus 102 are described further below with respect to FIG. 2. Accordingly, it will be appreciated that the apparatus 102 may comprise an apparatus configured to implement and/or otherwise support implementation of various example embodiments described herein.

It should be noted that the components, devices or elements illustrated in and described with respect to FIG. 1 below may not be mandatory and thus some may be omitted in certain embodiments. Additionally, some embodiments may include further or different components, devices or elements beyond those illustrated in and described with respect to FIG. 1.

The apparatus 102 may include or otherwise be in communication with processing circuitry 110 that is configurable to perform actions in accordance with one or more example embodiments disclosed herein. In this regard, the processing circuitry 110 may be configured to perform and/or control performance of one or more functionalities of the apparatus 102 (e.g., functionalities of a computing device on which the apparatus 102 may be implemented) in accordance with various example embodiments, and thus may provide means for performing functionalities of the apparatus 102 (e.g., functionalities of a computing device on which the apparatus 102 may be implemented) in accordance with various example embodiments. The processing circuitry 110 may be configured to perform data processing, application execution and/or other processing and management services according to one or more example embodiments. In some embodiments, the apparatus 102 or a portion(s) or component(s) thereof, such as the processing circuitry 110, may be embodied as or comprise a chip or chip set. In other words, the apparatus 102 or the processing circuitry 110 may comprise one or more physical packages (e.g., chips) including materials, components and/or wires on a structural assembly (e.g., a baseboard). The apparatus 102 or the processing circuitry 110 may therefore, in some cases, be configured to implement an embodiment of the invention on a single chip or as a single "system on a chip." As such, in some cases, a chip or chipset may constitute means for performing one or more operations for providing the functionalities described herein.

In some example embodiments, the processing circuitry 110 may include a processor 112 and, in some embodiments, such as that illustrated in FIG. 1, may further include memory 114. The processing circuitry 110 may be in communication with or otherwise control a user interface 116 and/or a communication interface 118. As such, the processing circuitry 110 may be embodied as a circuit chip (e.g., an integrated circuit chip) configured (e.g., with hardware, software or a combination of hardware and software) to perform operations described herein.

The processor 112 may be embodied in a number of different ways. For example, the processor 112 may be embodied as various processing means such as one or more of a microprocessor or other processing element, a coprocessor, a controller or various other computing or processing devices including integrated circuits such as, for example, an ASIC (application specific integrated circuit), an FPGA (field programmable gate array), or the like. Although illustrated as a single processor, it will be appreciated that the processor 112 may comprise a plurality of processors. The plurality of processors may be in operative communication with each other and may be collectively configured to perform one or more functionalities of the apparatus 102 as described herein. The plurality of processors may be embodied on a single computing device or distributed across a plurality of computing devices collectively configured to function as the apparatus 102. In some example embodiments, the processor 112 may be configured to execute instructions stored in the memory 114 or otherwise accessible to the processor 112. As such, whether configured by hardware or by a combination of hardware and software, the processor 112 may represent an entity (e.g., physically embodied in circuitry—in the form of processing circuitry 110) capable of performing operations according to embodiments of the present invention while configured accordingly. Thus, for example, when the processor 112 is embodied as an ASIC, FPGA or the like, the processor 112 may be specifically configured hardware for conducting the operations described herein. Alternatively, as another example, when the processor 112 is embodied as an executor of software instructions, the instructions may specifically configure the processor 112 to perform one or more operations described herein.

In some example embodiments, the memory 114 may include one or more non-transitory memory devices such as, for example, volatile and/or non-volatile memory that may be either fixed or removable. In this regard, the memory 114 may comprise a non-transitory computer-readable storage medium. It will be appreciated that while the memory 114 is illustrated as a single memory, the memory 114 may comprise a plurality of memories. The plurality of memories may be embodied on a single computing device or may be distributed across a plurality of computing devices collectively configured to function as the apparatus 102. The memory 114 may be configured to store information, data, applications, instructions and/or the like for enabling the apparatus 102 to carry out various functions in accordance with one or more example embodiments. For example, the memory 114 may be configured to buffer input data for processing by the processor 112. Additionally or alternatively, the memory 114 may be configured to store instructions for execution by the processor 112. As yet another alternative, the memory 114 may include one or more databases that may store a variety of files, contents or data sets. Among the contents of the memory 114, applications may be stored for execution by the processor 112 in order to carry out the functionality associated with each respective application. In some cases, the memory 114 may be in communication with one or more of the processor 112, user interface 116, or communication interface 118 via a bus or buses for passing information among components of the apparatus 102.

The user interface 116 may be in communication with the processing circuitry 110 to receive an indication of a user input at the user interface 116 and/or to provide an audible, visual, mechanical or other output to the user. As such, the user interface 116 may include, for example, a keyboard, a mouse, a joystick, a display, a touch screen display, a microphone, a speaker, a Light Emitting Diode (LED), a lighting device, an electronic sensor for capturing human body movements, and/or other input/output mechanisms. In embodiments in which the apparatus 102 is implemented on a server, aspects of the user interface 116 may be limited, or the user interface 116 may even be eliminated.

The communication interface 118 may include one or more interface mechanisms for enabling communication with other devices and/or networks. In some cases, the communication interface 118 may be any means such as a device or circuitry embodied in either hardware, or a combination of hardware and software that is configured to receive and/or transmit data from/to a network and/or any other device or module in communication with the processing circuitry 110. By way of example, the communication interface 118 may be configured to enable the apparatus 102 to communicate with another computing device via a wireless network, such as a wireless local area network (WLAN), cellular network, and/or the like. Additionally or alternatively, the communication interface 118 may be configured to enable the apparatus 102 to communicate with another computing device via a wireline network. In some example embodiments, the communication interface 118 may be configured to enable communication between the apparatus 102 and one or more further computing devices via the internet. Accordingly, the communication interface 118 may, for example, include an antenna (or multiple antennas) and supporting hardware and/or software for enabling communications with a wireless communication network (e.g., a wireless local area network, cellular network, and/or the like) and/or a communication modem or other hardware/software for supporting communication via cable, digital subscriber line (DSL), universal serial bus (USB), Ethernet or other methods.

Having now described an apparatus configured to implement and/or support implementation of various example embodiments, features of several example embodiments will now be described. It will be appreciated that the following features are non-limiting examples of features provided by some example embodiments. Further, it will be appreciated that embodiments are contemplated within the scope of disclosure that implement various subsets or combinations of the features further described herein. Accordingly, it will be appreciated that some example embodiments may omit one or more of the following features and/or implement variations of one or more of the following features.

FIG. 2 is a block diagram of a process flow 200 among a plurality of devices in communication with a macro identification module in accordance with an example embodiment of the present invention. The process flow 200 illustrates how input from three devices, device A 204, device B 206, and device C 208 can be processed by a macro identification module 202 to produce output instructions for one or more of the three devices. The macro identification module 202 is operable to compare the inputs received from each of the three devices with a set of macros provided by a macro datastore 210. Although inputs are primarily described with respect to user input on the one or more devices, other input criteria could also be employed. For example, a device may include a microphone for measuring ambient noise, or a light sensor for measuring ambient light. Such inputs may also be used to identify whether a macro should be executed.

Although the macro identification module 202 is depicted as a separate device, the functionality of the macro identification module 202 could be implemented on one of the three devices 204, 206, 208. In some embodiments, the macro identification module 202 may be implemented on a separate device, such as a device bridge configured to send and receive input from each of the devices. In yet further embodiments, the macro identification module 202 may be implemented as a separate device with its own processing circuitry. Each of the devices described with respect to FIG. 2 may be a computing device such as the apparatus 102 described with respect to FIG. 1.

Alternately, some combination of the devices may be implemented as a single apparatus 102. As an example, device A 204 may be a smart phone, device B 206 may be a tablet computer, and device C 208 may be a desktop computer. Alternatively, each of the devices 204, 206, 208 may be any type of computing device capable of executing program code to send or receive interface commands, including, but not limited to, medical devices and diagnostic equipment, industrial equipment, construction equipment, laboratory equipment, or any other specific or general purpose computing device.

The macro identification module 202 may be operable to receive inputs from one or more entities, such as the devices 204, 206, 208. The macro identification module 202 may communicate with the devices 204, 206, 208 to receive the input via a network over a wired or wireless protocol, such as 802.11 or Bluetooth. The macro identification module 202 may execute in response to input from one of the device 204, 206, 208 (e.g., upon launching an application that is configured to receive communication from the macro identification module). The macro identification module 202 may determine if a particular macro has been executed by determining whether particular flags have been set for one or more macros stored in the macro datastore 210. For example, the macro identification module 202 may set flags for the various macros contained within the macro datastore 210, and execute a macro when all flags for the macro have been set.

The macro datastore 210 may store macros, rules, and criteria configurations and associations. The macro datastore 210 may thus store all elements required to receive an input sequence and generate an output sequence from and to devices coupled to the macro identification module 202. In some embodiments, the macro datastore 210 may be stored as a data structure as part of the macro identification module 202, or it may be stored as a separate structure or database. Various tools may be enabled for access and modification of the macro datastore 210, such as, for example, a macro creation or definition tool. Each macro may be defined within the macro datastore 210 by a set of rules for the macro. The rules may specify a set of criteria that trigger the macro. Macros may be associated with particular keystrokes or input operations, timing values (e.g., all elements of the macro must occur within a particular time period from the first element), order values (e.g., input X must occur prior to input Y to activate the macro), device contexts (e.g., the device must be executing a particular application to trigger the flag of the macro), application states (e.g., an application executing on a device has at least two images open, a user is logged in to an application with a minimum permission level, or the like) or device types (e.g., the input must be received from a smart phone or tablet).

The rules of the macro may specify particular relationships among the criteria. For example, Boolean operators (e.g., AND, OR, NOT, XOR) may be used to specify that particular criteria are mutually exclusive, that particular criteria must occur together, that at least one of a particular criteria must occur, that a particular criteria must not occur, and the like. In this regard, macros may be defined in a hierarchical manner, which a particular macro comprises one or more rules, each rule comprises one or more criteria, and each criteria may include an operand and an operator.

Operands may include both a type (e.g., what does the value describe, or which value should be tested/retrieved by the macro identification module 202), and indication as to which entity the operand is for (e.g., to which device does the operand pertain), and an indication of a value (if the operand requires a value). Operators may include Boolean values as described above, arithmetic values, textual values, results from other rules, or the like. Some example operands may also include constants (e.g., the operand is a static value specified in the configuration of the macro), a current time, an input value, or an initial active time (e.g., the operand value is taken internally at the initial time a rule or criterion became active, and the operand refers to an available criterion or rule for a particular macro).

In some embodiments, particular rules or criteria may be associated with particular time values. The inputs to a given macro may be associated with a particular time value for which the inputs are valid. In the same manner, rule results and criteria may also be assigned time values for which the results and criteria are valid (e.g., a rule may be true only for a particular period of time). The timer for each input to the macro may begin when the particular input occurs, and the input may remain valid for triggering the macro for the duration specified by the timer. If an input for the macro does not occur until after another input has expired, then the macro may not execute until the first condition is valid again, assuming the first condition is valid again before the expiration of any of the other conditions.

A macro may execute when all rule results, criterion results, and joining Boolean operations result in a TRUE value for the macro. The macro may also include a set of output instructions to be performed by at least one of the devices when the macro is executed. A particular macro may instruct any of the devices to perform an action, and the particular actions may vary from device to device. In some embodiments, the macro may instruct a device other than the devices from which input was received. Macros may be defined relative to a particular application (e.g., save an open document in a word processor) or relative to a device (e.g., input the key strokes ALT and S at the same time). In this manner, applications that are configured to communicate with a macro identification module 202 as described herein may perform advanced processing, while applications that are not configured as such may still receive command input via the macro identification module 202 mimicking input from another input to the device (e.g., a keyboard).

Macros may also be configured to prevent mutual execution of other macros (e.g., if macro A executes, disable activation criteria for macro B). Additionally or alternatively, macros may also be configured to enable activation of other macros (e.g., only execute macro B if macro A has been executed). Rule configurations may also enforce an explicit evaluation order for macros. Such a configuration may ensure that no parts of the operation expression for a particular rule or criterion are evaluated until other rules or criterion operation expressions have been satisfied.

FIG. 3 depicts an example system 300 employing a plurality of devices 204, 206, 208 coupled by a bridge module 302. The system 300 illustrates an example of a possible implementation of device A 204, device B 206, device C 208, the macro identification module 202, and the macro datastore 210 as described with respect to FIG. 2. The bridge module 302 may be embodied by a computing device, such as a server, a desktop computer or the like, and operable to receive inputs from each of the devices 204, 206, 208 and to send the inputs to a macro identification module 202. Each of the devices 204, 206, 208 may have a bridge interface 304 for enabling communication with the bridge module 302. The bridge interface 304 may be implemented as hardware (e.g. physical interface circuitry), software (e.g., a program for sending input received from each device over a network to the bridge module), or a combination thereof. The bridge interface 304 may be aware of the operating context of the device to which the bridge interface 304 is associated. For example, the bridge interface 304 may be aware of which applications are executing upon the device, the type of the device (e.g., smart phone, tablet, desktop computer, laptop computer, etc.), or the like. The bridge interface 304 may include network hardware or software for communicating input received from the devices 204, 206, 208 to the bridge module.

The bridge module 302 may provide inputs received from the devices 204, 206, 208 to a macro identification module 202 as described above with respect to FIG. 2. The bridge interface 304 may transmit all input operations performed by the device to which the bridge interface 304 is associated, or only input operations that are associated with macro criteria may be provided to the macro identification module 202 via the bridge module 302. The macro identification module 202 may identify one or more macros based on input received from the devices 204, 206, 208 using definition rules for the macros as specified by the macro datastore 210. Upon determining that conditions for a particular macro are met, the macro identification module 202 may execute the macro upon an input target 306. The input target 306 may be an application designed to receive communications from the macro identification module 202 directly, or the input target 306 may receive the macro instructions indirectly, such as by the macro identification module 202 causing the receiving computing device to mimic input from one or more input devices.

FIG. 4 is a flow diagram depicting an example of a method 400 for processing a multiple device macro in accordance with example embodiments of the invention. The method 400 is operable to receive input from a plurality of devices and to instruct a device (either one of the plurality of devices or another device) to perform actions defined by the macro. The macro may be a macro as described above with respect to FIG. 2, including a series of rules comprised of criteria, which in turn are comprised of operands and operators. As inputs are received by the macro identification module 202, the macro identification module 202 identifies criteria that are satisfied for the macros to which it has access. Macros may generally be associated with a particular time value to ensure that user input may reset periodically (e.g., a second input thirty minutes after a first input generally should not trigger a macro associated with performing both inputs simultaneously). As such, the method 400 is operable to monitor inputs and to set flag conditions for macros as appropriate. When all of the flag conditions for a macro are met, the macro identification module 202 may cause execution of the macro.

At action 402, an input is received from at least one device coupled to the macro identification module 202. As described above, the macro identification module 202 may receive the input via a network, such as a wired or wireless network, such as by a bridge interface 304 as described with respect to FIG. 3. As described above, all input operations performed by devices coupled to the macro identification module 202 may be received by the macro identification module 202, or only input operations that are associated with macro operations may be received by the macro identification module 202. In this regard, a bridge interface coupled to the device that provides the input operation may perform filtering operations on input operations performed using the device; input operations that relate to macro criteria specified in a macro datastore may be provided to the macro identification module by these bridge interfaces.

At action 404, the macro identification module 404 may set flags corresponding to macro criteria associated with the received input. When a particular criterion is marked as true (e.g., a particular keystroke is pressed), it may be considered active for the particular macro rule for which it became true. A rule that becomes active in this manner may remain true until the macro completes, or an active timer threshold associated with the criterion is exceeded. In this manner, upon setting the flag corresponding to the input operation, the macro identification module 202 may also initiate a timer for the particular rule, or for the macro as a whole.

At action 406, a determination is made as to whether all rules for a particular macro have been activated (e.g., set to true). To track which rules of a particular macro are set to true, the macro identification module 202 may maintain a data structure of macro criteria, along with the timers and/or conditions that would cause those criteria to fail. The data structure may include references to each macro for which criteria have been received, as each macro may be associated with different timers, or the data structure may include all criteria with global timers. In some embodiments, an individual rule or criteria may be associated with multiple timers, with each timer associated with a separate macro. If all criteria for a particular macro have been met, the method 400 proceeds to action 408 to execute the macro. Otherwise, the method proceeds to action 410 to determine if any of the rules should be deactivated due to a timer expiration.

At action 408, if all rules for a particular macro have been activated (e.g., set to true), then the macro may execute. Execution of the macro may include instructing one or more devices coupled to the macro identification module or one or more particular applications executing on the devices to perform particular processing functions associated with the macro. For example, a particular macro may require a user to perform a clockwise circle gesture on a tablet touch screen and a counterclockwise circle gesture on a smart phone touch screen. These input operations may result in a medical device display (e.g., a CT scan imager) to zoom out the display and rotate 180 degrees about the y plane.

At action 410, a determination is made as to whether one or more timers have expired. As described above, criteria that have been identified for macros may be associated with expiration timers, such that such criteria do not remain true indefinitely. Upon expiration of an activation timer, all flags associated with the macro may be set to false and the timers expired, ensuring that the macro is not inadvertently activated. If a timer or timers have expired, the method 400 proceeds to action 412 where one or more flags associated with the timer are unset. If no timers have expired, the method returns to action 402 to continue receiving input from the one or more devices.

It will be understood that each block of the flowchart, and combinations of blocks in the flowchart, may be implemented by various means, such as hardware, firmware, processor, circuitry, and/or other devices associated with execution of software including one or more computer program instructions. For example, one or more of the procedures described above may be embodied by computer program instructions. In this regard, the computer program instructions which embody the procedures described above may be stored by a memory 104 of an apparatus employing an embodiment of the present invention and executed by a processor 102 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowchart support combinations of means for performing the specified functions and combinations of operations for performing the specified functions for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In some embodiments, certain ones of the operations above may be modified or further amplified. Furthermore, in some embodiments, additional optional operations may be included. Modifications, additions, or amplifications to the operations above may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodi- That which is claimed:

1. A method comprising:

receiving, via a first bridge interface aware of an operating context of a first user device of a plurality of user devices, a first user input from the first user device, the first user input comprising a first input operation performed by a user on the first user device, each of the plurality of devices configured with a processor and a memory for execution of program code;

providing, by the first bridge interface, the first user input to a macro identification module only in an instance in which the first user input is associated with macro criteria;

identifying, using a processor of the macro identification module, that at least a first rule for a macro is satisfied by the first user input, the first rule defining a first time period beginning upon receiving the first input and the macro defining at least one input operation to be performed by at least one of the plurality of devices, wherein the first rule is marked as unsatisfied by the macro identification module upon expiration of the first time period;

receiving, via a second bridge interface aware of an operating context of a second user device of the plurality of user devices and before the expiration of the first time period identified by the macro identification module, a second user input from the second user device, the second user input comprising a second input operation performed by the user on the second user device;

providing, by the second bridge interface, the second user input to the macro identification module only in an instance in which the second user input is associated with the macro criteria;

identifying, by the macro identification module, that at least a second rule for the macro is satisfied by the second user input, the second rue defining a second time period beginning upon receiving the second input, wherein the second rule is marked as unsatisfied by the macro identification module upon expiration of the second time period;

determining, by the macro identification module, that all rules for the macro have been satisfied within both the first time period and the second time period; and sending instructions from the macro identification module corresponding to the input operation defined by the macro to the at least one of the plurality of devices in response to determining that all rues for the macro have been met.

2. The method of claim 1, wherein the first user input further comprises an indication of a device type of the first user device, and wherein the first rule for the macro further requires that the device type of the first user device is a particular device type.

3. The method of claim 1, wherein the first rule comprises one or more criteria, and wherein the one or more criteria each comprise at least one operator and at least one operand.

4. The method of claim 3, wherein the criteria include at least one of an input operation, a device context, an application state, a timing value, an order value, or a device type.

5. The method of claim 1, wherein the first user input further comprises an indication of an application executing on the first user device to which the first input was provided, and wherein the first rule for the macro further requires that the application is executing on the first user device.

6. The method of claim 1, further comprising setting one or more rules associated with the macro to be unsatisfied in response to at least one of the first time period or the second time period expiring before all rules for the macro have been satisfied.

7. The method of claim 1, wherein the method is performed by the at least one of the plurality of devices receiving the instructions.

8. An apparatus comprising processing circuitry configured to:

receive, via a first bridge interface aware of an operating context of a first user device of a plurality of user devices, a first user input from the first user device, the first user input comprising a first input operation performed by a user on the first user device, each of the plurality of devices configured with a processor and a memory for execution of program code;

provide, by the first bridge interface, the first user input to a macro identification module on in an instance in which the first user input is associated with macro criteria;

using the macro identification module, that at least a first rule for a macro is satisfied by the first user input, the first rule defining a first time period beginning upon receiving the first input and the macro defining at least one input operation to be performed by at least one of the plurality of devices; wherein the first rule is marked as unsatisfied by the macro identification module upon expiration of the first time period;

receive, via a second bridge interface aware of an operating context of a second user device of the plurality of user devices and before the expiration of the first time period identified try the macro identification module, a second user input from the second user device, the second user input comprising a second input operation performed by the user on the second user device;

macro identification module only in an instance in which the second user input is macro identification module only in an instance in which the second user input is associated with the macro criteria;

identify, using the macro identification module, that at least a second rule for the macro is satisfied by the second user input, the second rule defining a second time period beginning upon receiving the second input, wherein the second rule is marked as unsatisfied by the macro identification module upon expiration of the second time period;

determine, by the macro identification module, that all rules for the macro have been satisfied within both the first time period and the second time period; and send instructions from the macro identification module corresponding to the input operation defined by the macro to the at least one of the plurality of devices in response to determining that all rules for the macro have been met.

9. The apparatus of claim 8, wherein the first user input further comprises an indication of a device type of the first user device, and wherein the first rule for the macro further requires that the device type of the first user device is a particular device.

10. The apparatus of claim 8, wherein the first rule comprises one or more criteria, and wherein the one or more criteria each comprise at least one operator and at least one operand.

11. The apparatus of claim 8, wherein the criteria include at least one of an input operation, a device context, an application state, a timing value, an order value, or a device type.

12. The apparatus of claim 8, wherein the first user input further comprises an indication of an application executing on the first user device to which the first input was provided, and wherein the first rule for the macro further requires that the application is executing on the first user device.

13. The apparatus of claim 8, wherein the processing circuitry is further configured to set one or more rules associated with the macro to be unsatisfied in response to at least one of the first time period or the second time period expiring before all rules for the macro have been satisfied.

14. The apparatus of claim 8, wherein the apparatus is the at least one of the plurality of devices receiving the instructions.

15. A computer program product comprising at least one non-transitory computer-readable storage medium bearing computer program instructions embodied therein for use with a computer, the computer program instructions comprising program instructions configured to:

receive, via a first bridge interface aware of an operating context of a first user device of a plurality of user devices, a first user input from the first user device, the first user input comprising a first input operation performed by a user on the first user device, each of the plurality of devices configured with a processor and a memory for execution of program code;

provide, by the first bridge interface, the first user input to a macro identification module only in an instance in which the first user input is associated with macro criteria;

identify, using the macro identification module, that at least a first rule for a macro is satisfied by the first user input, the first rule defining a first time period beginning upon receiving the first input and the macro defining at least one input operation to be performed by at least one of the plurality of devices; wherein the first rule is marked as unsatisfied by the macro identification module upon expiration of the first time period;

receive, via a second bridge interface aware of an operating context of a second user device of the plurality of user devices and before the expiration of the first time period identified by the macro identification module, a second user input from the second user device, the second user input comprising a second input operation performed by the user on the second user device;

provide, by the second bridge interface, the second user input to the macro identification module only in an instance in which the second user input is associated with the macro criteria;

identify, using the macro identification module, that at least a second rule for the macro is satisfied by the second user input, the second rule defining a second time period beginning upon receiving the second input, wherein the second rule is marked as unsatisfied by the macro identification module upon expiration of the second time period;

determine, using the macro identification module that all rules for the macro have been satisfied within both the first time period and the second time period; and send instructions from the macro identification module corresponding to the input operation defined by the macro to the at least one of the plurality of devices in response to determining that all rules for the macro have been met.

16. The computer program product of claim 15, wherein the first user input further comprises an indication of a device type of the first user device, and wherein the first rue for the macro further requires that the device type of the first user device is a particular device.

17. The computer program product of claim 15, wherein the first rule comprises one or more criteria, and wherein the one or more criteria each comprise at least one operator and at least one operand.

* * * * *

UNITED STATES PATENT AND TRADEMARK OFFICE
CERTIFICATE OF CORRECTION

PATENT NO. : 9,665,382 B2
APPLICATION NO. : 13/612285
DATED : May 30, 2017
INVENTOR(S) : Wong Page 1 of 1

It is certified that error appears in the above-identified patent and that said Letters Patent is hereby corrected as shown below:

In the Claims

Column 11,
Line 53, "second rue" should read --second rule--;
Line 64, "all rues" should read --all rules--.

Column 12,
Line 34, "module on" should read --module only--;
Line 37, "using" should read --identify, using--;
Line 48, "try" should read --by--;
Lines 52 and 53, "macro identification module only in an instance in which the second user input is" should read --provide, by the second bridge interface, the second user input to the--;
Line 63, "by" should read --using--.

Column 14,
Line 37, "first rue" should read --first rule--.

Signed and Sealed this
Sixth Day of February, 2018

Joseph Matal
*Performing the Functions and Duties of the
Under Secretary of Commerce for Intellectual Property and
Director of the United States Patent and Trademark Office*